US010989428B2

(12) United States Patent
Kokugan et al.

(10) Patent No.: US 10,989,428 B2
(45) Date of Patent: Apr. 27, 2021

(54) PERFORMANCE DIAGNOSIS DEVICE AND PERFORMANCE DIAGNOSIS METHOD FOR AIR CONDITIONER

(71) Applicant: Hitachi, Ltd., Tokyo (JP)

(72) Inventors: Yoko Kokugan, Tokyo (JP); Hiroshi Kusumoto, Tokyo (JP); Tatsuo Fujii, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 106 days.

(21) Appl. No.: 16/471,894

(22) PCT Filed: Mar. 10, 2017

(86) PCT No.: PCT/JP2017/009704
§ 371 (c)(1),
(2) Date: Jun. 20, 2019

(87) PCT Pub. No.: WO2018/163402
PCT Pub. Date: Sep. 13, 2018

(65) Prior Publication Data
US 2019/0316798 A1    Oct. 17, 2019

(51) Int. Cl.
*F24F 11/38* (2018.01)
*F24F 11/64* (2018.01)
(Continued)

(52) U.S. Cl.
CPC ............. *F24F 11/38* (2018.01); *F24F 11/64* (2018.01); *G05B 23/0283* (2013.01);
(Continued)

(58) Field of Classification Search
CPC ........ F24F 11/38; F24F 11/64; F24F 2140/50; G05B 23/0283; G05B 2219/2614; G06F 11/3075; G06F 11/3079
See application file for complete search history.

(56) References Cited

U.S. PATENT DOCUMENTS 6,732,538 B2 * 5/2004 Trigiani ............. B60H 1/00585
62/129
2011/0093121 A1 * 4/2011 Wakuta ................. F24F 11/62
700/276
(Continued)

FOREIGN PATENT DOCUMENTS

JP       2010-19440 A     1/2010
JP       2011-12839 A     1/2011
(Continued)

OTHER PUBLICATIONS

International Search Report (PCT/ISA/210) issued in PCT Application No. PCT/JP2017/009704 dated Jun. 6, 2017 with English translation (two (2) pages).
(Continued)

*Primary Examiner* — Ramesh B Patel
(74) *Attorney, Agent, or Firm* — Crowell & Moring LLP (57) ABSTRACT

A performance diagnosis device for an air conditioner includes: a data collection unit that collects and records operation data on the air conditioner; an equipment characteristic database that is a data group covering operation conditions meeting the specifications of the air conditioner; a reference data creation unit that calculates individual characteristic curved surface data by using the operation data possessed by the data collection unit and the equipment characteristic database; and a performance evaluation unit that compares part of the operation data possessed by the data collection unit with the individual characteristic curved surface data to evaluate the performance of the air conditioner, in which the individual characteristic curved surface data is corrected with respect to the equipment characteristic database so as to correspond to the operation data possessed by the data collection unit. Thus, it is possible to detect the performance deterioration of the air conditioner regardless (Continued)

of the magnitude of the air conditioning load and to clarify the necessity of the maintenance work for the air conditioner.

12 Claims, 9 Drawing Sheets

(51) Int. Cl.
  *G06F 11/30* (2006.01)
  *G05B 23/02* (2006.01)
  *F24F 140/50* (2018.01)
(52) U.S. Cl.
  CPC ...... *G06F 11/3075* (2013.01); *G06F 11/3079* (2013.01); *F24F 2140/50* (2018.01)

(56) References Cited

U.S. PATENT DOCUMENTS

| | | | | |
|---|---|---|---|---|
| 2012/0053898 A1* | 3/2012 | Togano | ................... | F25B 1/053 702/182 |
| 2013/0154839 A1* | 6/2013 | Barton | ..................... | F24F 11/30 340/584 |
| 2014/0266755 A1* | 9/2014 | Arensmeier | ............. | F24F 11/62 340/679 |
| 2016/0169572 A1* | 6/2016 | Noboa | .................... | F25B 13/00 62/115 |
| 2016/0377309 A1* | 12/2016 | Abiprojo | ................ | G06Q 10/06 700/276 |
| 2018/0202681 A1* | 7/2018 | Kim | ........................ | F24F 11/38 |

FOREIGN PATENT DOCUMENTS

| | | |
|---|---|---|
| JP | 2015-203544 A | 11/2015 |
| JP | 2016-205640 A | 12/2016 |

OTHER PUBLICATIONS

Japanese-language Written Opinion (PCT/ISA/237) issued in PCT Application No. PCT/JP2017/009704 dated Jun. 6, 2017 (five (5) pages).

* cited by examiner

| X-AXIS | Y-AXIS | Z-AXIS |
|---|---|---|
| LOAD FACTOR (%) | COP | COOLING WATER INLET TEMPERATURE (°C) |
| 20 | 3.1 | 32 |
| | 3.3 | 28 |
| | 3.5 | 24 |
| | 3.9 | 20 |
| | 4.6 | 16 |
| | 5.8 | 12 |
| 40 | 4.9 | 32 |
| | 5.3 | 28 |
| | 5.7 | 24 |
| | 6.3 | 20 |
| | 7.2 | 16 |
| | 8.9 | 12 |
| 60 | 5.7 | 32 |
| | 6.2 | 28 |
| | 6.9 | 24 |
| | 7.6 | 20 |
| | 8.6 | 16 |
| | 10.0 | 12 |
| 80 | 5.9 | 32 |
| | 6.6 | 28 |
| | 7.3 | 24 |
| | 8.1 | 20 |
| | 9.1 | 16 |
| | 10.7 | 12 |
| 100 | 6.3 | 32 |
| | 6.9 | 28 |
| | 7.5 | 24 |
| | 8.3 | 20 |
| | 9.4 | 16 |
| | 11.2 | 12 |

| CASE | MEASURING SENSOR | | | | | EVALUATION PARAMETER | | |
|---|---|---|---|---|---|---|---|---|
| | 1 | 2 | 3 | 4 | 5 | X | Y | Z |
| 1 | COLD WATER INLET TEMPERATURE | COLD WATER OUTLET TEMPERATURE | COOLING WATER INLET TEMPERATURE | COOLING WATER OUTLET TEMPERATURE | FLOW RATE RATIO OF COOLING WATER TO COLD WATER | LOAD FACTOR | COP | COOLING WATER INLET TEMPERATURE |
| 2 | COLD WATER INLET TEMPERATURE | COLD WATER OUTLET TEMPERATURE | COOLING WATER INLET TEMPERATURE | POWER CONSUMPTION | — | COLD WATER TEMPERATURE DIFFERENCE | POWER CONSUMPTION | COOLING WATER INLET TEMPERATURE |
| 3 | COLD WATER INLET TEMPERATURE | COLD WATER OUTLET TEMPERATURE | AMBIENT AIR TEMPERATURE OF CONDENSER | POWER CONSUMPTION | COLD WATER FLOW RATE | LOAD FACTOR | POWER CONSUMPTION | AMBIENT AIR TEMPERATURE OF CONDENSER |

PERFORMANCE DIAGNOSIS DEVICE AND PERFORMANCE DIAGNOSIS METHOD FOR AIR CONDITIONER

TECHNICAL FIELD

The present invention relates to a performance diagnosis device and a performance diagnosis method for an air conditioner.

BACKGROUND ART

As a device for cooling a relatively large space, such as various factories and buildings, a heat driven refrigerating machine or an electric refrigerating machine is used. Since primary energy consumption of the refrigerating machine occupies about 20% to 30% of the energy consumption of the entire building, energy saving promotion has been particularly demanded in recent years.

In general, a refrigerating machine controls the cooling output according to the required cooling load, and the output changes complicatedly such that the output is large in a midsummer season such as July and August, and the output is small in intermediate seasons such as May and October.

Moreover, since the refrigerating machine is supposed to be used for a long time, it is important not only to select highly efficient equipment at the time of installation but also to maintain system performance after a long period of time for energy saving. The above refrigerating machine includes a water circuit that carries cold heat from the refrigerating machine to a cooled space, and a cooling water circuit for inputting heat into the refrigerating machine and dissipating heat from the cooled space. Thus, scale and the like adhere to the inside of pipes over time, causing deterioration of the equipment itself. In order to maintain predetermined system performance, it is necessary to eliminate performance deterioration by regular maintenance work.

PTL 1 discloses a refrigerating machine deterioration diagnosis device and a refrigerating machine deterioration diagnosis method, in which an actual COP and an actual LTD, which indicate actual performance under an evaluation operation situation, are calculated based on evaluation operation situation data for the purpose of accurately separating tube washing and an overhaul as maintenance contents that should be performed against performance deterioration of a refrigerating machine, a COP variation amount, which indicates a difference between the actual COP and an evaluation reference COP, and an LTD variation amount, which indicates a difference between the actual LTD and an evaluation reference LTD, are calculated, and the case is classified depending on whether or not a variation ratio R of the COP variation amount to the LTD variation amount at the time of the evaluation is within a certain determination region Q. Herein, the LTD is an abbreviation for Leaving Temperature Difference, which is one of indices indicating the cooling efficiency of the refrigerating machine. PTL 1 also describes an explanatory diagram (FIG. 6) showing a reference COP estimation model expressed as a belt-shaped curved surface in a three-dimensional space.

CITATION LIST

Patent Literature

PTL 1: JP 2016-205640 A

SUMMARY OF INVENTION

Technical Problem

If maintenance work involving the operation stop of the air conditioner is performed during a midsummer season with a large cooling load or during a midwinter season with a large heating load, the comfort in the building that is the cooling or heating (air conditioning) target will be significantly impaired. Thus, it is desirable to predict in advance the time when performance deterioration will appear and to perform the maintenance work during a spring or fall season with a small air conditioning load. It is needless to say that the maintenance work may be performed at the time without load, such as a winter season, when only the cooling operation is performed, but the heating operation is not performed.

Regarding the creation of the reference COP estimation model used for the deterioration diagnosis of the refrigerating machine, PTL 1 describes that the operation situation data on the refrigerating machine obtained before the evaluation time point may be utilized in general. However, PTL 1 does not disclose a concept of using the operation situation data on the refrigerating machine from the viewpoint of detecting performance deterioration in a season with a small cooling load.

For a refrigerating machine (air conditioner), even of the same model, with different exerting performance depending on the installation place and the operation condition, it has been difficult to discriminate between deterioration and measurement error causing a deviation of an evaluation parameter calculated from operation data acquired during actual operation from catalog data (evaluation parameter) particularly in a season with a small cooling load.

An object of the present invention is to detect the performance deterioration of the air conditioner regardless of the magnitude of the air conditioning load and clarify the necessity of maintenance work for the air conditioner.

Solution to Problem

A performance diagnosis device for an air conditioner according to the present invention includes: a data collection unit that collects and records operation data on the air conditioner; an equipment characteristic database that is a data group covering operation conditions meeting the specifications of the air conditioner; a reference data creation unit that calculates individual characteristic curved surface data by using the operation data possessed by the data collection unit and the equipment characteristic database; and a performance evaluation unit that compares part of the operation data possessed by the data collection unit with the individual characteristic curved surface data to evaluate performance of the air conditioner, in which the individual characteristic curved surface data is corrected with respect to the equipment characteristic database so as to correspond to the operation data possessed by the data collection unit.

Advantageous Effects of Invention

According to the present invention, it is possible to detect the performance deterioration of the air conditioner regardless of the magnitude of the air conditioning load and to clarify the necessity of the maintenance work for the air conditioner.

DESCRIPTION OF EMBODIMENTS

A performance diagnosis device and a performance diagnosis method for an air conditioner according to the present invention are suitable as technology for monitoring the air conditioner from a remote place.

In the following description, the cooling operation of a refrigerating machine is mainly described. However, in a case of a heat pump which can perform not only the cooling operation but also the heating operation, it is necessary to take into consideration an air conditioning load including a cooling load and a heating load. This specification discloses technology which can be applied to both a case of only the cooling operation and a case of performing both the cooling operation and the heating operation. The refrigerating machine, the heat pump and the like are collectively referred to as an "air conditioner". An air conditioning load factor described later means a load factor of the air conditioner that performs at least one of the cooling operation or the heating operation.

The air conditioner may be any one of an electric type or a heat driven type.

An electric air conditioner includes an electric compressor. Meanwhile, examples of the heat driven air conditioner include an absorption refrigerating machine, an absorption heat pump, an adsorption refrigerating machine, an adsorption heat pump, and the like. The heat source of the heat driven air conditioner is combustion heat of gas, petroleum or the like, factory exhaust heat, or the like.

Hereinafter, a performance diagnosis device and a performance diagnosis method for an air conditioner (refrigerating machine) according to examples of the present invention will be described in detail with reference to the drawings.

EXAMPLES

Figure 1:
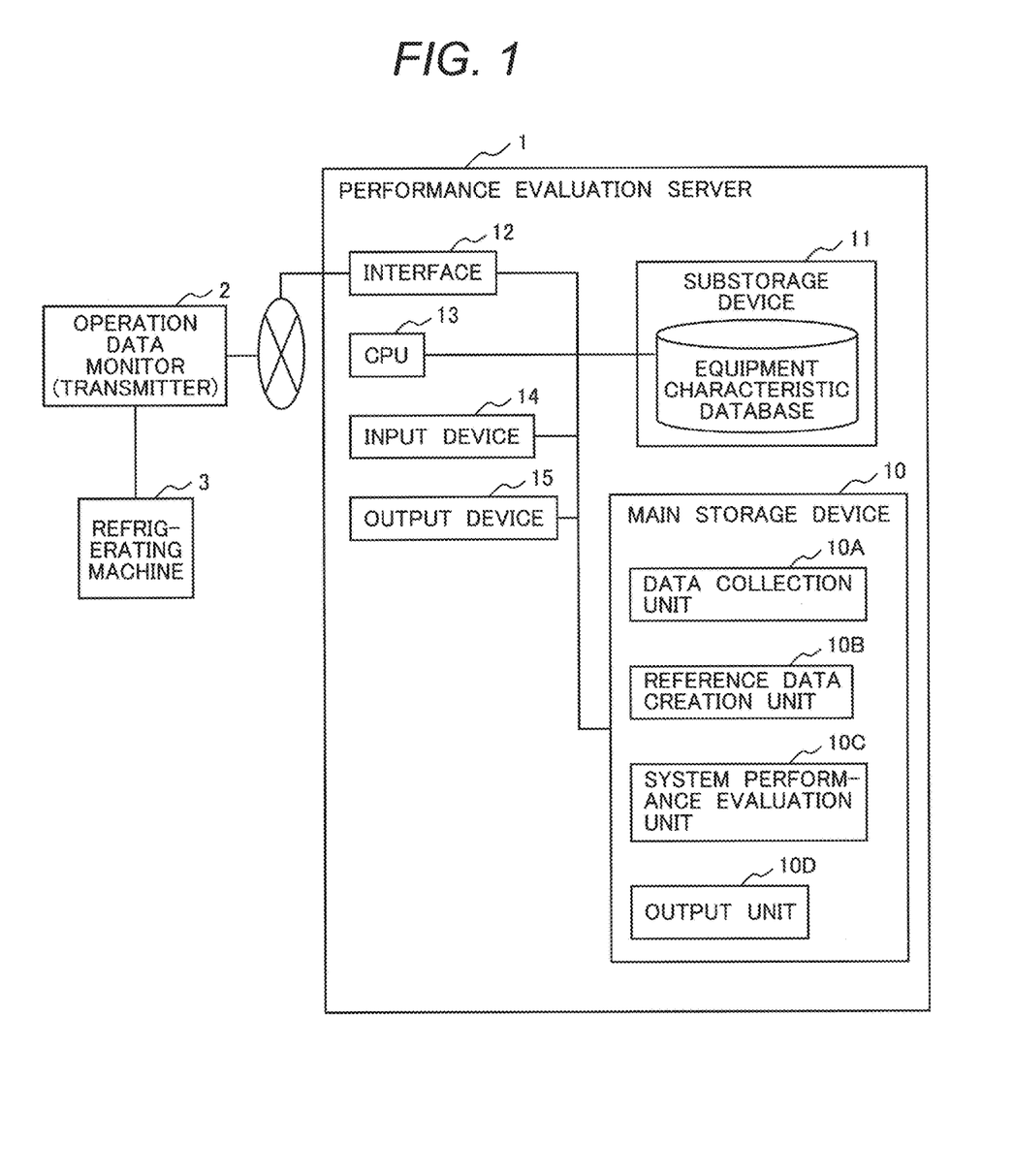
FIG. 1 is a block diagram showing the configuration of a performance evaluation server according to an example.
Figure 2:
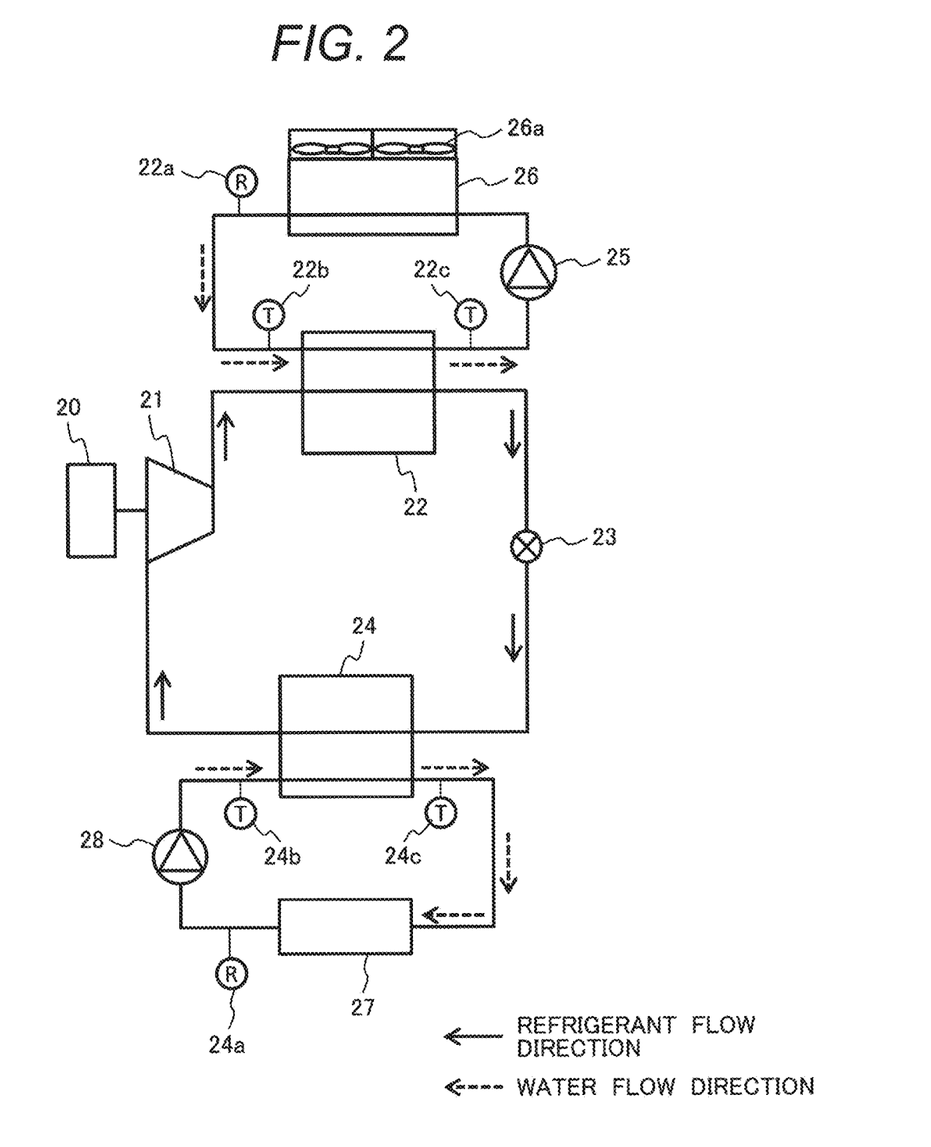
FIG. 2 is a schematic configuration diagram showing the structure of the refrigerating machine and the arrangement of measuring sensors according to the example.

FIG. 1 is a block diagram showing the configuration of a performance evaluation server according to this example. FIG. 2 shows one example of the configuration of the refrigerating machine that is a performance evaluation target.

First, the configuration of the performance evaluation server in FIG. 1 will be described.

A performance evaluation server 1 (performance diagnosis device) for a refrigerating machine 3 is connected to the refrigerating machine 3 via an operation data monitor 2 which is a transmitter. Operation data acquired by the operation data monitor 2 includes signals from sensors provided in the refrigerating machine 3 and includes raw data obtained from the actually operating refrigerating machine 3. In this example, a turbo refrigerating machine is presumed as the refrigerating machine 3, and the details of the configuration thereof will be described later using FIG. 2.

The performance evaluation server 1 is provided with a main storage device 10 (first storage unit), a substorage device 11 (second storage unit), an interface 12, a central processing unit (CPU) 13, an input device 14 (input unit) and an output device 15 (output unit) and diagnoses a performance change in the refrigerating machine 3. The main storage device 10 is constituted by a data collection unit 10A, a reference data creation unit 10B, a system performance evaluation unit 10C (performance evaluation unit) and an output unit 10D. Note that the first storage unit and the second storage unit can be collectively referred to simply as a "storage unit".

The data collection unit 10A has a function of measuring data corresponding to desired evaluation parameters via the sensors provided in the refrigerating machine 3 and a function of recording the measured time-series data as history data.

In the substorage device 11, an equipment characteristic database is stored.

FIG. 2 is a configuration diagram showing one example of the structure of the refrigerating machine 3 and the arrangement of measuring sensors when the performance evaluation server is applied. This example shows the case where the refrigerating machine 3 is a turbo refrigerating machine.

In the turbo refrigerating machine, a refrigerant circuit is mainly constituted by sequentially connecting a turbo compressor 21, which obtains power from an electric motor 20, a condenser 22, an expansion mechanism 23 and an evaporator 24 by refrigerant piping.

As the measuring sensors, a cold water inlet temperature sensor 24b, a cold water outlet temperature sensor 24c, a cooling water inlet temperature sensor 22b, a cooling water outlet temperature sensor 22c, a cold water flowmeter 24a and a cooling water flowmeter 22a are provided at various places.

In the evaporator 24, cold water is generated so that the temperature measured by the cold water outlet temperature sensor 24c has a predetermined value. This cold water is sent to a cooled space 27 (the interior of a building or the like) by the power of a water circulation pump 28 and absorbs heat from the cooled space 27. The cold water, which has absorbed the heat and whose temperature has risen, exchanges heat with the refrigerant of the evaporator 24 and is cooled. Then, the refrigerant of the evaporator 24 is carried to the condenser via the refrigerant piping and dissipates heat to the cooling water. The cooling water is sent to a cooling tower 26 by the water circulation pump 25. In the cooling tower 26, a cooling tower fan 26a is controlled so that the temperature measured by the cooling water inlet temperature sensor 22b has a predetermined value, and the heat of the cooling water is dissipated to the atmosphere.

The equipment configuration and operation of the refrigerating machine 3 shown in FIG. 2 are merely examples and do not limit the operation principle, arrangement and the like of the refrigerating machine which is an evaluation target of the performance evaluation server 1 for the refrigerating machine according to this example.

The reference data creation unit 10B in FIG. 1 has a function of creating data on the system performance in a state where the refrigerating machine 3 is not deteriorated over the entire presumed operation range by using the equipment characteristic database stored in the substorage device 11 and part of the data stored in the data collection unit 10A.

Figure 3:
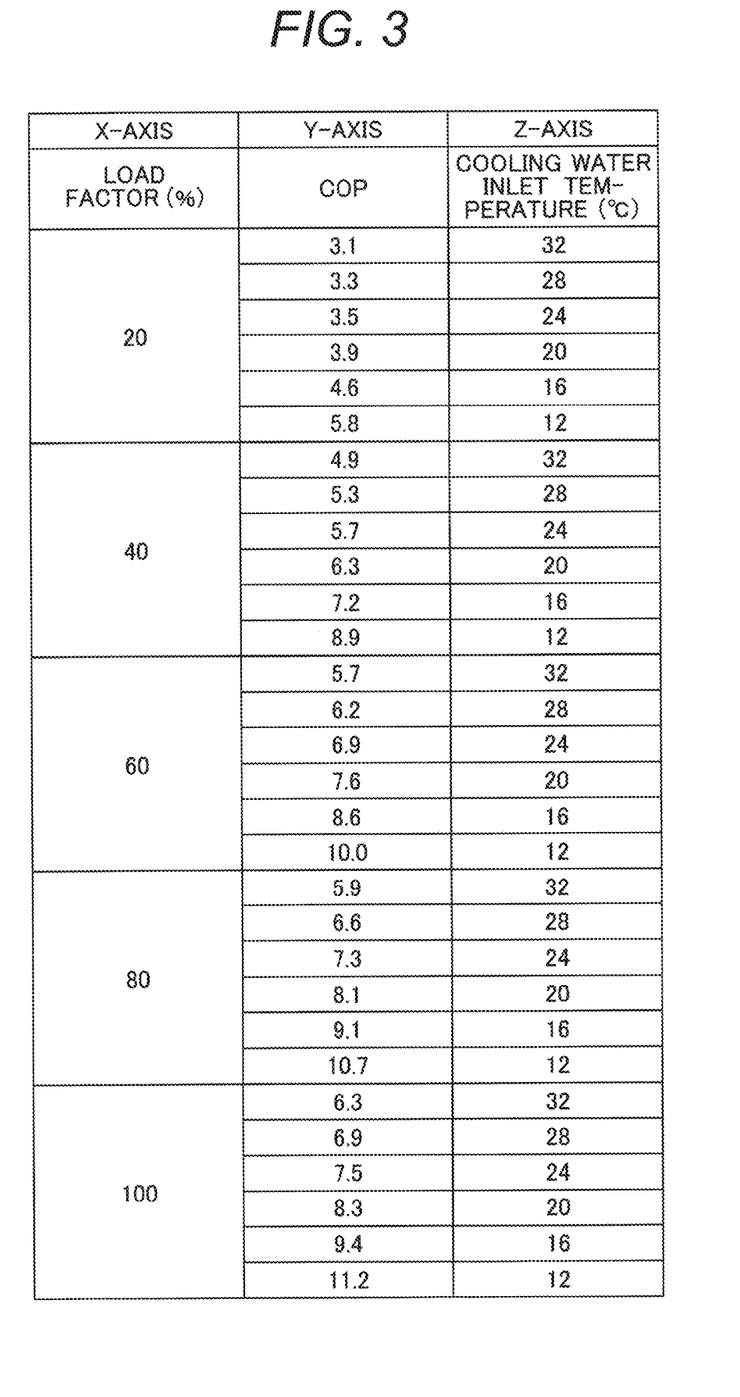
FIG. 3 is a table showing one example of an equipment characteristic database according to the example.

FIG. 3 shows one example of data included in the equipment characteristic database.

The equipment characteristic database is a data group covering the operation conditions that meet the specifications of the refrigerating machine. The equipment characteristic database may be a collection created by utilizing the design values of the refrigerating machine, the results of the quality confirmation test measured using a testing machine before the shipment in order to be posted in the catalog issued by the refrigerating machine manufacturer, and the like. A coefficient of performance (COP) corresponding to the system performance of the refrigerating machine varies depending on the air conditioning load factor, the cooling water inlet temperature, the cold water outlet temperature, and the like. In this drawing, the cold water outlet temperature is fixed, and the air conditioning load factor (hereinafter simply referred to as a "load factor"), the COP and the cooling water inlet temperature are used as evaluation parameters and sorted out by three axes, an X-axis, a Y-axis and a Z-axis.

As shown in this drawing, when compared at the same load factor, the COP is high under the condition where the cooling water inlet temperature is low (spring, fall and winter). On the other hand, the COP is low under the condition where the cooling water inlet temperature is high (summer).

Note that the evaluation target of this example is a water-cooled refrigerating machine, but instead of the cooling water inlet temperature, the ambient air temperature of the condenser may be an evaluation parameter in an air-cooled refrigerating machine not requiring cooling water.

Herein, the air conditioning load factor is a value obtained by dividing the processing heat amount in an indoor unit by the rated capacity of the air conditioning. When the cold water is cooled by the evaporator and supplied to the indoor unit during the cooling operation, the air conditioning load factor is a value obtained by dividing the difference between the cold water outlet temperature and the cold water inlet temperature in the actually operating refrigerating machine by the difference between the cold water outlet temperature and the cold water inlet temperature, which are set as the design values of the refrigerating machine. Specifically, the values of the inlet temperature and the outlet temperature of the cold water cooled by the evaporator 24 are measured by the cold water inlet temperature sensor 24b and the cold water outlet temperature sensor 24c, respectively in FIG. 2 to be used for the calculation.

In general, in a case of a compression refrigerating machine (heat pump), it is also possible to perform the heating operation using heat generated in the condenser. In this case, when the hot water is heated by the condenser and supplied to the indoor unit, the air conditioning load factor is a value obtained by dividing the difference between the hot water outlet temperature and the hot water inlet temperature in the actually operating heat pump by the difference between the hot water outlet temperature and the hot water inlet temperature, which are set as the design values of the heat pump. Note that, when the heating operation by the compression refrigerating machine (heat pump) is performed using air as the heat medium circulating through the indoor unit and the condenser, the air temperatures on the upstream side and the downstream side of the condenser are measured, and the air conditioning load factor is calculated with the air temperatures as the inlet temperature and the outlet temperature, respectively, by the same calculation as in the case of the hot water.

In a case of the heating operation in an absorption heat pump, the heating is performed by heating the hot water with the heat generated in at least one of the condenser or the absorber and sending this hot water to the indoor unit. Thus, the air conditioning load factor is a value obtained by dividing the average value of the differences between the hot water outlet temperature and the hot water inlet temperature in the actually operating absorption heat pump for the hot water returned from the indoor unit by the difference between the hot water outlet temperature and the hot water inlet temperature, which are set as the design values of the absorption heat pump.

Incidentally, even though the actual system performance of the refrigerating machine is not deteriorated from the system performance at the initial installation, the actual system performance of the refrigerating machine is generally lower than the equipment characteristic data due to the influence of the installation situation and the like. In this example, in order to accurately grasp the system performance in a state where each piece of equipment is not deteriorated, part of the data stored in the data collection unit 10A is used to correct the equipment characteristic data, thereby creating the individual characteristic curved surfaces.

Figure 4:
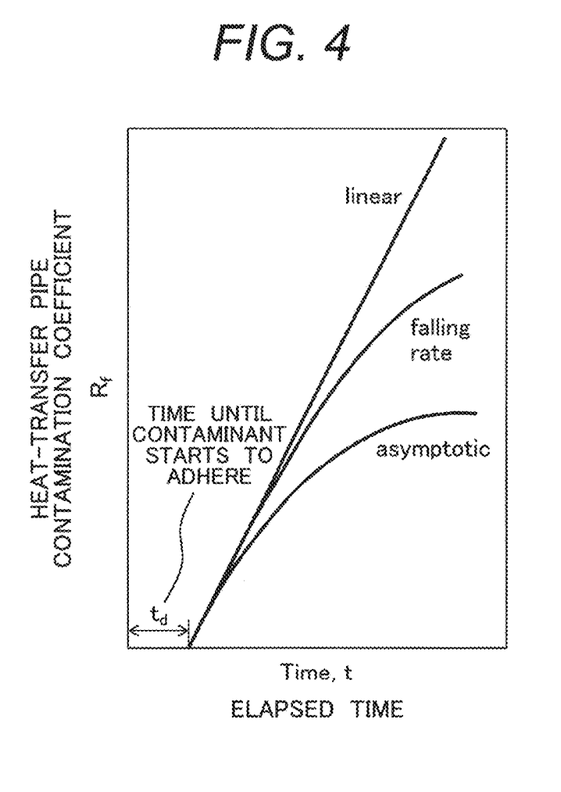
FIG. 4 is a graph showing a time-series change in general heat-transfer pipe contamination.

FIG. 4 is a graph showing a time-series change in general heat-transfer pipe contamination.

Most of deterioration causes of the system performance of the refrigerating machine are due to adhesion of scale and the like to the inside of the heat-transfer pipe of the cooling water or the cold water. In the heat-transfer pipe, mineral components in water crystallize by heating and evaporating the circulating water, and the crystals deposit and become the scale.

As can be seen from FIG. 4, there is a certain period td in which a contaminant does not adhere to the inside of the heat-transfer pipe although the adhesion speed of the contaminant (scale) varies depending on the flow rate and the temperature of the circulating water. This period varies depending on the configuration of the equipment, the installation environment, the operation situation and the like. However, the refrigerating machine as shown in this example has a tendency that there is almost no deterioration of the system performance caused by scale adhesion for one year after the installation. Moreover, as can be seen from this drawing, when the contaminant starts to adhere, the contamination coefficient rapidly increases.

Therefore, in the reference data creation unit 10B shown in FIG. 1, for example, data on the first one year (hereinafter referred to as "normal data") out of the operation data stored in the data collection unit 10A is used to correct the equipment characteristic data, thereby creating, as the individual characteristic curved surfaces, data on the system performance in a state where the refrigerating machine 3 is not deteriorated in the entire presumed operation range. Note that the normal data does not necessarily have to be the data on the one year as long as sufficient data is collected in shorter or longer than one year to create the individual characteristic curved surfaces.

Accordingly, in the system performance evaluation unit 10C, the performance of the air conditioner can be evaluated by comparing the operation data (operation data in a period different from that of the normal data), which is measured after the normal data is acquired, with the data on the individual characteristic curved surfaces. Note that the comparison target operation data may include part of the normal data.

As described above, since the corrected individual characteristic curved surface data can be obtained based on the actual operation data acquired for each model, a slight performance deterioration of the refrigerating machine 3 can be detected.

Figure 5:
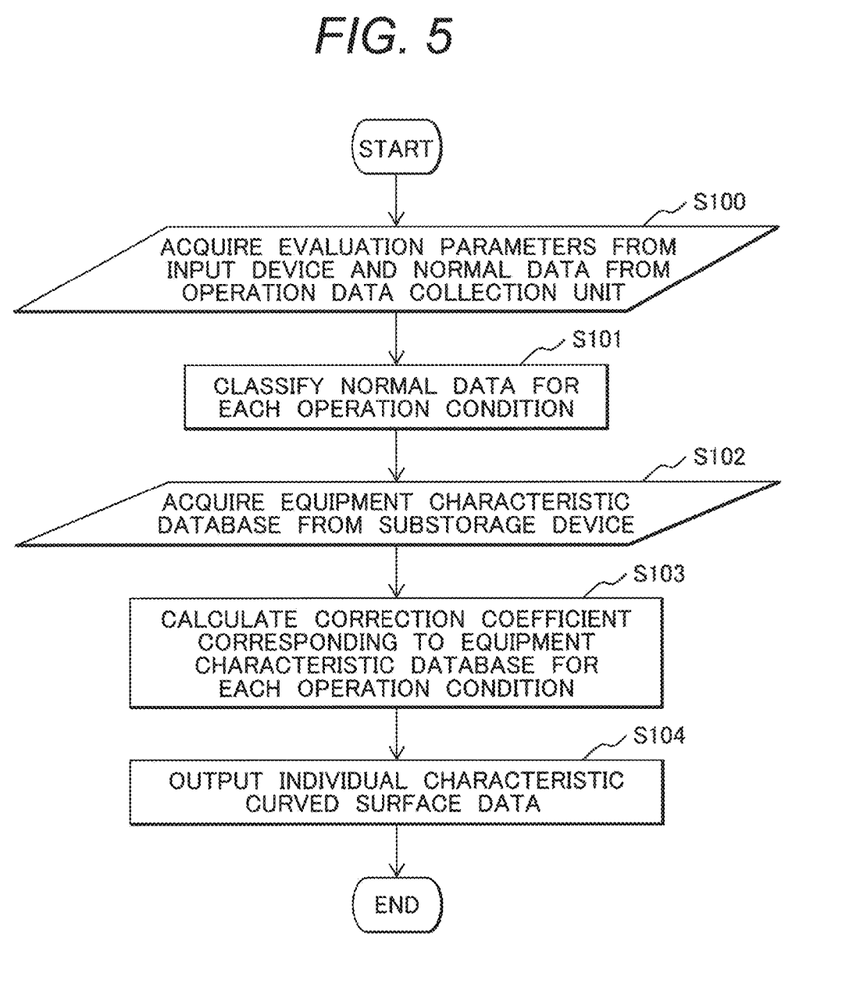
FIG. 5 is a flowchart showing processing steps in the reference data creation unit according to the example.

FIG. 5 is a flowchart showing the data processing in the reference data creation unit 10B in FIG. 1. Hereinafter, using FIG. 5, a method of creating the aforementioned individual characteristic curved surfaces in the reference data creation unit 10B will be described. Note that, in the following description, the reference signs used in FIGS. 1 and 2 are also added.

First, in S100, the evaluation parameters inputted from the input device 14 are acquired as well as the normal data is acquired from the data collection unit 10A. In this example, the evaluation parameters are the load factor, the COP and the cooling water inlet temperature.

Herein, the load factor is the ratio of the difference between the actual operation data on the cold water inlet temperature sensor 24b and the cold water outlet temperature sensor 24c to the difference between the cold water inlet temperature and the cold water outlet temperature, which are maximum in the equipment characteristic data. The COP is a value obtained as follows: (1) the difference between the temperatures obtained by the cold water outlet temperature sensor 24c and the cold water inlet temperature sensor 24b is multiplied by the measured value of the cold water flowmeter 24a; (2) the difference between the temperatures obtained by the cooling water inlet temperature sensor 22b and the cooling water outlet temperature sensor 22c is multiplied by the measured value of the cooling water flowmeter 22a; (3) the difference between the temperatures obtained by the cold water outlet temperature sensor 24c and the cold water inlet temperature sensor 24b is multiplied by the measured value of the cold water flowmeter 24a; (4) the value obtained in (3) is subtracted from the value obtained in (2); and (5) the value obtained in (1) is divided by the value obtained in (4). Moreover, the cooling water inlet temperature is the measured value of the cooling water inlet temperature sensor 22b.

Next, in S101, in order to evaluate the system performance, the normal data is classified for each operation condition with the load factor and the cooling water inlet temperature as the operation conditions other than the COP corresponding to the system performance of the refrigerating machine 3 in the evaluation parameters.

Thereafter, in S102, the equipment characteristic database is acquired from the substorage device 11. Then, in S103, a correction coefficient for matching the normal data with the equipment characteristic data is calculated for each operation condition. Depending on the operation conditions of the refrigerating machine 3, there may be no normal data, but interpolation or extrapolation of the correction coefficients of portions where the operation conditions match is performed to calculate the correction coefficients in the entire operation range in the equipment characteristic database. By calculating the correction coefficients in this way, the correction coefficients can be calculated in the entire operation range corresponding to the normal data even when there are few normal data obtained from the refrigerating machines (actually installed refrigerating machines) in different installation situations.

Finally, in S104, each of the data in the equipment characteristic database is multiplied by the corresponding correction coefficient for each operation condition to create individual characteristic curved surface data which is the system performance without deterioration of the actually installed refrigerating machine 3. This data is outputted from the output unit 10D of the main storage device 10 not only as a data group similar to the equipment characteristic database, but also as a three-dimensional graph in which the load factor, the COP, and the cooling water inlet temperature, which are the evaluation parameters, are the three axes, the X-axis, the Y-axis, and the Z-axis, respectively, and displayed on the operation data monitor 2 via the output device 15.

Figure 6:
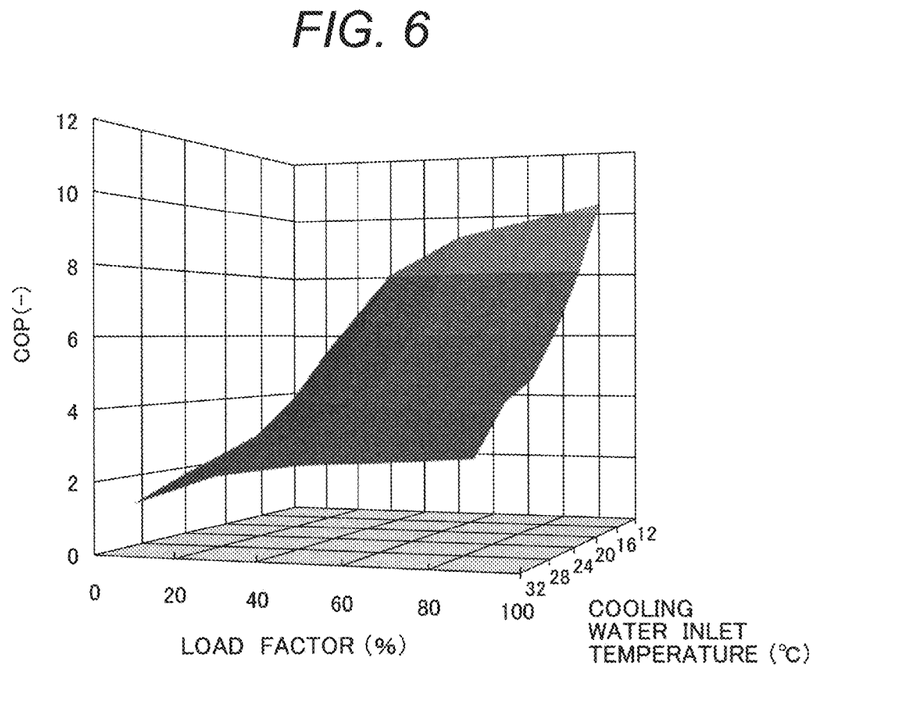
FIG. 6 is a three-dimensional graph showing one example of an individual characteristic curved surface according to the example.

FIG. 6 shows one example of the individual characteristic curved surface displayed on the operation data monitor 2.

As shown in this drawing, when the cooling water inlet temperature is low and the load factor is high, the COP is high. On the other hand, when the cooling water inlet temperature is high and the load factor is low, the COP is low.

Note that the evaluation parameters only need to be composed of items corresponding to the performance of the refrigerating machine and the operation conditions and can be changed as appropriate by the measuring sensors installed in the evaluation target refrigerating machine.

Thus, the individual characteristic curved surface data, which is obtained from the equipment characteristic database and the normal data on the refrigerating machine different from a test refrigerating machine installed in the building actually air-conditioned, can be used as accurate approximate data on the refrigerating machine, which is reference in the entire operation range. The individual characteristic curved surface data is reference data in the entire operation range taking into consideration the installation state including the arrangement of the piping of the refrigerating machine, the inclination of the device, and the like, the installation states of the measuring sensors and the like slightly different for each device, and the like. Note that the equipment characteristic database is complete with the data group in all regions of the required load factor and the evaluation parameters calculated from the data group. The data group also includes data under operation conditions with a low load factor, and the data may be the design values of the refrigerating machine, data accurately measured before the shipment by a test refrigerating machine (testing machine), or the like.

Figure 7:
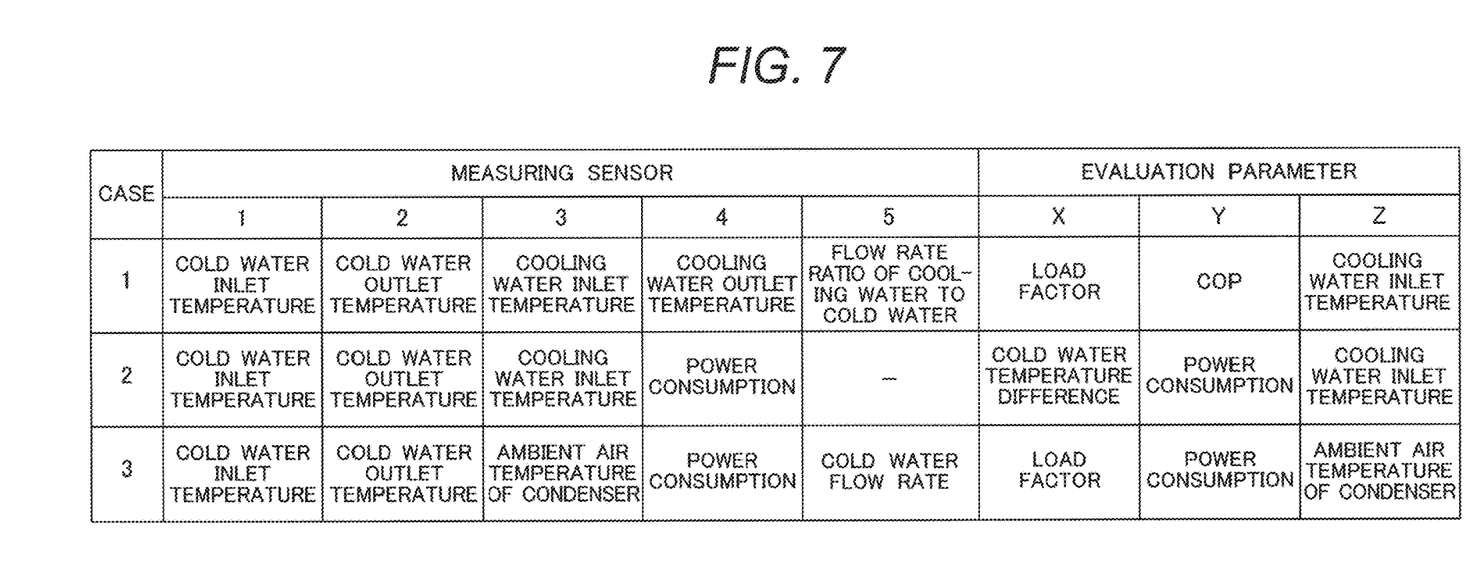
FIG. 7 is a table showing one example of the composition of the evaluation parameters according to the example.

FIG. 7 shows one example of the composition of the evaluation parameters for the installed measuring sensors.

Case 1 corresponds to FIG. 6 Meanwhile, Cases 2 and 3 are modification examples.

Evaluation parameters X and Z shown in FIG. 7 correspond to the X-axis and the Z-axis in FIG. 6 and are external factors influencing the performance of the air conditioner (refrigerating machine). Meanwhile, an evaluation parameter Y shown in FIG. 7 corresponds to the Y-axis in FIG. 6 and is an index parameter for the performance evaluation. In other words, the evaluation parameter Y is sorted out in relation to the evaluation parameters X and Z. Thus, the evaluation parameters X, Y and Z are grouped as a data group.

Note that the number of evaluation parameters, which are external factors influencing the performance of the air conditioner, may be three or more.

In summary, the individual characteristic curved surface data includes two or more evaluation parameters (operation conditions) which are external factors influencing the performance of the air conditioner, and the two or more evaluation parameters are sorted out in relation to the other one evaluation parameter (index of the performance evaluation).

Note that, in a case of an absorption refrigerating machine, the evaluation parameter, which is an external factor influencing the performance of the air conditioner, may be the inlet temperature of the cooling water or the cooling air for removing the heat generated in at least one of the absorber or the condenser. The index evaluation parameter for the performance evaluation may be an input heat amount into a regenerator.

Moreover, the evaluation parameters, which are external factors influencing the performance of the air conditioner, may be functions related to the air conditioning load factor.

Next, a method of evaluating the system performance according to this example will be described.

Figure 8:
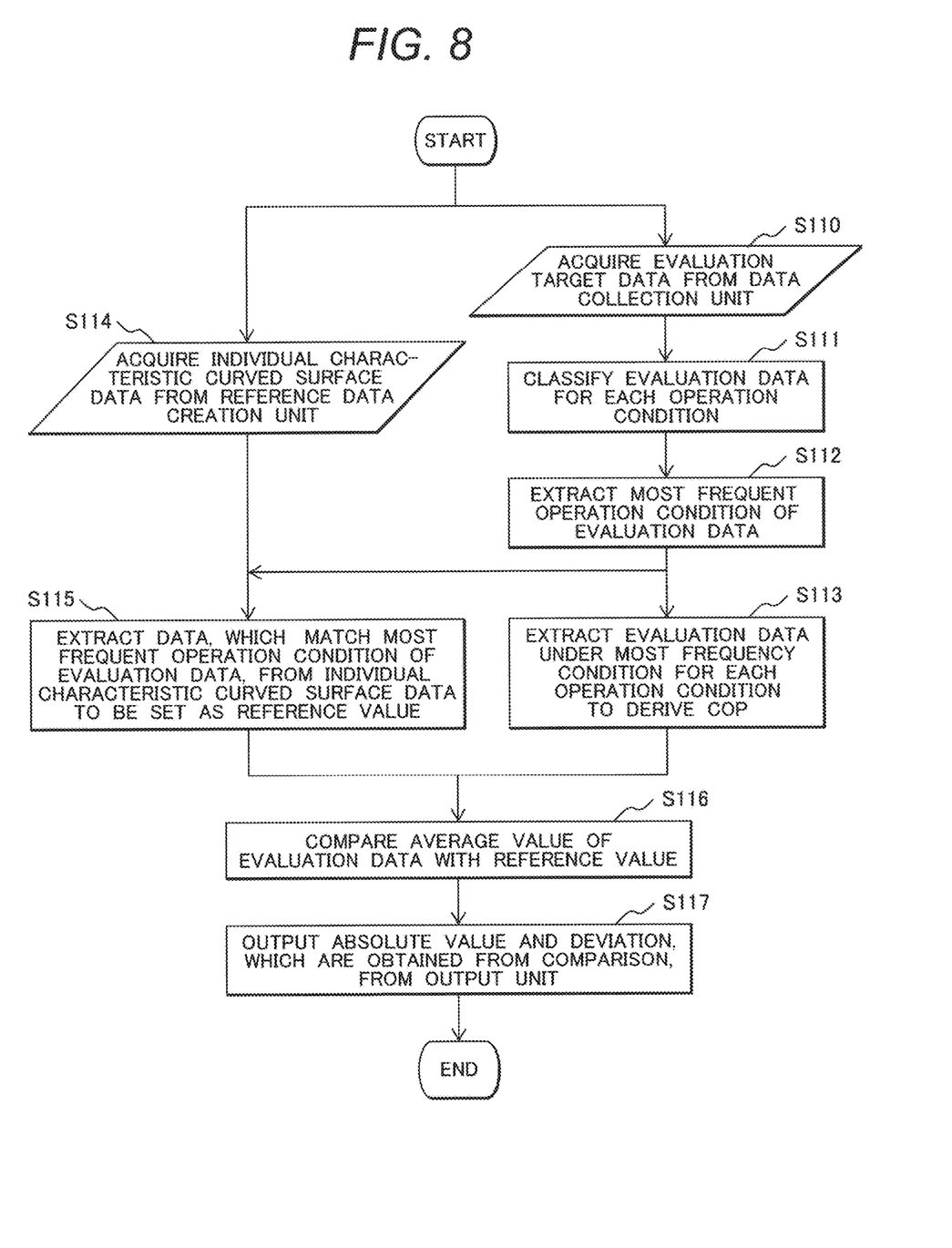
FIG. 8 is a flowchart showing processing steps in the system performance evaluation unit according to the example.

FIG. 8 is a flowchart showing processing steps in the system performance evaluation unit 10C according to this example.

First, in S110, evaluation target data is acquired from the data collection unit 10A. The evaluation target data is the operation data on the refrigerating machine 3 (FIG. 1) in a designated period. As a method of designating the period, an arbitrary evaluation period may be inputted from the input device 14 in FIG. 1, or the evaluation may be set to be performed automatically every certain period. In other words, the evaluation target data is part of the operation data possessed by the data collection unit 10A.

Next, in S111, the evaluation target data is classified for each operation condition. This operation condition is matched with the evaluation parameter of the operation conditions of the individual characteristic curved surfaces and is the cooling water inlet temperature in this example. Thereafter, in S112, the operation condition (the most frequent operation condition) with the highest emergence frequency in the classified evaluation target data is extracted. Herein, the most frequent operation condition in this example is the load factor with the highest emergence frequency. Moreover, when the operation condition for classifying the evaluation target data is the load factor in S111, the most frequent operation condition is the cooling water inlet temperature with the highest emergence frequency.

Further, in S113, the COP is derived from the evaluation target data in the load factor with high emergence frequency extracted for each cooling water inlet temperature condition and is set as representative evaluation data. Note that, instead of the COP, the power consumption used in Cases 2 and 3 in FIG. 7 may be used as the representative evaluation data. When the COP is lowered, the performance is determined to be deteriorated. On the other hand, when the power consumption increases, the performance is determined to be deteriorated. Therefore, the representative evaluation data is the average value in the region of the index parameter for the performance evaluation.

Meanwhile, in S114, the individual characteristic curved surface data created by the reference data creation unit 10B is acquired.

Then, in S115, data matching the operation condition of the representative evaluation data in the individual characteristic curved surface data is extracted and set as a reference value. Therefore, the reference value is the value of the individual characteristic curved surface data in the operation condition corresponding to the value of the representative evaluation data (in the case of FIG. 6, the value of the Y-axis (COP)).

In S116, the representative evaluation data in S113 is compared with the reference value in S115. Specifically, the deviation of the evaluation target data with respect to the normal data is calculated. This result is accumulated in the system performance evaluation unit 10C every time the evaluation is performed, and the deterioration degree is evaluated from the change in the system performance with respect to the elapsed time. In other words, the data collection unit 10A has a function of accumulating the results of comparing the operation data collected in a plurality of different periods with the individual characteristic curved surface data by the system performance evaluation unit 10C and determines the change in the performance of the air conditioner by using these results.

Finally, in S117, the absolute value and the deviation are outputted from the output unit 10D of the main storage device 10 and displayed on the operation data monitor 2 via the output device 15.

Note that the above deviation is calculated from the evaluation target data in a narrow range within the designated period, but the correction coefficients corresponding to the normal data are obtained for the entire region of the individual characteristic curved surface data. Thus, when the refrigerating machine continues to operate without maintenance work, it is possible to estimate how much the annual power consumption will increase, how much the running cost will increase, and the like. Accordingly, it is possible to provide a user with persuasive data on the necessity of the maintenance work.

Specifically, by using the operation data acquired during spring, fall, winter or the like under the operation condition with a low air conditioning load factor, it is possible to estimate the evaluation parameters, by the correction coefficients, in the range of all the operation conditions including the operation condition with a high air conditioning load factor. Thus, it is possible to judge the degree of the current performance deterioration in consideration of annual power consumption, running cost, and the like.

More specifically, the maximum value of the air conditioning load factor in a season with a high air conditioning load factor (generally midsummer in a case of the refrigerating machine) serves as a reference, and the data is collected in a season when the ratio of the air conditioning load factor to the maximum value is, for example, 50% or less (in a case of the refrigerating machine, in spring, fall, winter or the like). By using the data, the estimated values of the operation data in a region where the ratio exceeds 50% may be calculated to compare the estimated values with the individual characteristic curved surface data. Moreover, by using the estimated values, annual power consumption, running cost, and the like may be calculated. In consideration of annual power consumption, running cost, and the like, it is possible to judge the degree of the current performance deterioration. The above judgment may be made using the data collected in a season when the above ratio is 30% or less.

Figure 9:
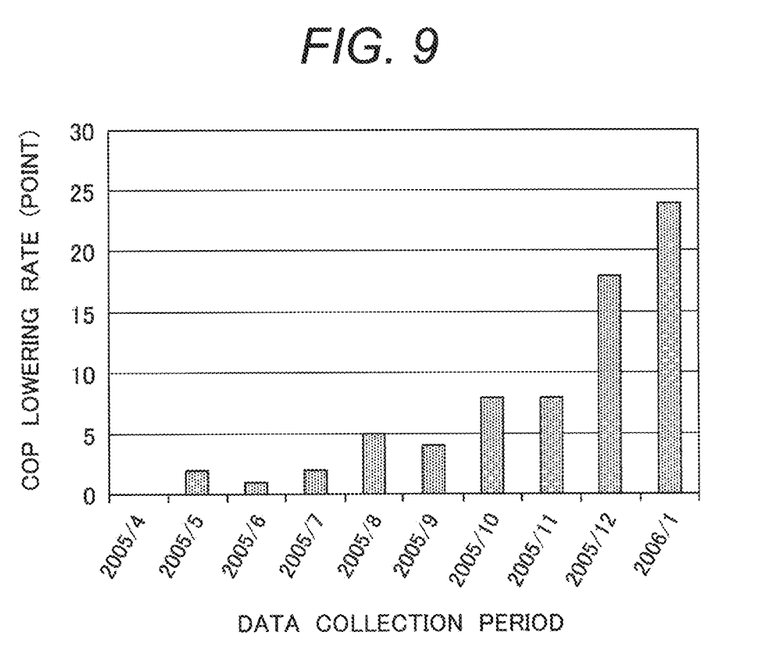
FIG. 9 is a graph showing one example of a screen outputted as a result of the performance evaluation according to the example.

FIG. 9 shows one example of the evaluation results displayed on the operation data monitor 2.

The evaluation results shown in FIG. 9 are the evaluation results of the system performance in the data collection period. Since the data serving as the reference value differs for each evaluation, the evaluation results are displayed by indicating the COP lowering rates (deviation) with points.

In this drawing, data on the COP lowering rates are acquired monthly. The COP lowering rate gradually increases to less than 10 points until November 2005, but increases to points or more in December 2005 and January 2006. By obtaining such data, it is possible to obtain a material for consideration to take measures, such as to perform maintenance work, for example, when the COP lower rate reaches a high value twice successively.

In other words, when the COP lowering rate, which is a value corresponding to the change in the performance of the air conditioner, exceeds a predetermined value a plurality of times, this may be reported as deterioration of the performance of the air conditioner.

Note that the monthly data are shown in this drawing, but the present invention is not limited thereto. For example, weekly data can be acquired, and these data may be used to judge the necessity of the maintenance work.

Accordingly, it is possible to accurately acquire small changes in individual refrigerating machines with high frequency and determine deterioration at an early stage.

Note that, in a case of the refrigerating machine, when the maximum value of the air conditioning load factor in a season with a high air conditioning load factor is a reference (generally midsummer in a case of the refrigerating machine), the ratio of the air conditioning load factor to the maximum value is often 50% or less (less than half) in spring, fall and winter seasons in general. In such seasons, by evaluating the performance using the operation data collected in these seasons, the maintenance work involving the operation stop of the air conditioner can be performed as necessary without significantly impairing the comfort in the building. The above ratio is further desirably 30% or less.

According to the performance evaluation server of this example, the following effects are exerted.

First, by creating individual characteristic curved surfaces for an air conditioner, even of the same model, with different initial system performance depending on the installation place and the operation situation, the system performance in a state without deterioration in the entire presumed operation range can be obtained. Thus, a deterioration degree can be diagnosed when the system performance in a state without deterioration under the conditions the same as the operation conditions of the evaluation target data is a reference value, and it is possible to detect deterioration of the system performance of the air conditioner in a short period of time. In other words, the performance deterioration of the air conditioner can be detected more quickly.

Moreover, although accurate deterioration detection is performed in this way, the number of measuring sensors can be few, and the introduction cost can be suppressed.

Then, the performance diagnosis can be performed according to the operation conditions of the evaluation target data regardless of the operation conditions of the air conditioner. Thus, the performance deterioration can be detected in a season with a low cooling load. As a result, maintenance work involving the operation stop of the air conditioner can be performed without impairing the comfort in the building.

REFERENCE SIGNS LIST 1 performance evaluation server
2 operation data monitor
3 refrigerating machine
10 main storage device
10A data collection unit
10B reference data creation unit
10C system performance evaluation unit
10D output unit
11 substorage device
12 interface
13 CPU
14 input device
15 output device
20 electric motor
21 turbo compressor
22 condenser
22a cooling water flowmeter
22b cooling water inlet temperature sensor
22c cooling water outlet temperature sensor
23 expansion mechanism
24 evaporator
24a cold water flowmeter
24b cold water inlet temperature sensor
24c cold water outlet temperature sensor
25, 28 water circulation pump
26 cooling tower
26a cooling tower fan
27 cooled space

The invention claimed is:

1. A performance diagnosis device for an air conditioner, the device comprising:
 a data collection unit configured to collect and record operation data on the air conditioner;
 an equipment characteristic database that is a data group covering operation conditions meeting specifications of the air conditioner;
 a reference data creation unit configured to receive evaluation parameters from an input unit and normal data of operation of the air conditioner during an initial period of operation of the air conditioner from the data collection unit, and calculate individual characteristic curved surface data of a performance of the air conditioner, in a state in which the operation of the air conditioner is not deteriorated in an entire presumed operation range, based on the operation data and the operation conditions; and
 a performance evaluation unit configured to compare part of the operation data possessed by the data collection unit with the individual characteristic curved surface data to evaluate the performance of the air conditioner,
 wherein the individual characteristic curved surface data is corrected with respect to the equipment characteristic database so as to correspond to the operation data possessed by the data collection unit.

2. The performance diagnosis device for the air conditioner according to claim 1, wherein the part of the operation data which is possessed by the data collection unit and used by the performance evaluation unit is collected in a period different from that of the operation data used to calculate the individual characteristic curved surface data.

3. The performance diagnosis device for the air conditioner according to claim 1, wherein the part of the operation data which is possessed by the data collection unit and used by the performance evaluation unit is collected in a period when a ratio of an air conditioning load factor calculated from the part of the operation data to a maximum value of the air conditioning load factor calculated from the operation data is 50% or less.

4. The performance diagnosis device for the air conditioner according to claim 1, wherein the performance evaluation unit has a function of comparing representative evaluation data with a reference value,
 the representative evaluation data is a parameter in a region including an operation condition with highest emergence frequency and is an index average value for performance evaluation, the parameter being of the part of the operation data which is possessed by the data collection unit and used by the performance evaluation unit, and the reference value is a value of the individual characteristic curved surface data under an operation condition corresponding to the representative evaluation data.

5. The performance diagnosis device for the air conditioner according to claim 1, wherein the performance evaluation unit uses data collected in a period when a ratio of an air conditioning load factor, which is the part of the operation data possessed by the data collection unit and is calculated from the part of the operation data, to a maximum value of the air conditioning load factor calculated from the operation data is 50% or less to calculate an estimated value of operation data in a region where the ratio exceeds 50%, and has a function of comparing the estimated value with the individual characteristic curved surface data.

6. The performance diagnosis device for the air conditioner according to claim 1, wherein the individual characteristic curved surface data includes two or more evaluation parameters which are external factors influencing the performance of the air conditioner, and the two or more evaluation parameters are sorted out in relation to another evaluation parameter.

7. The performance diagnosis device for the air conditioner according to claim 1, wherein the data collection unit has a function of accumulating results of comparing the operation data collected in a plurality of different periods with the individual characteristic curved surface data by the performance evaluation unit, and determines a change in the performance of the air conditioner by using the results.

8. The performance diagnosis device for the air conditioner according to claim 7, wherein the performance diagnosis device has a function of reporting, as deterioration of the performance, in a case where a value corresponding to the change in the performance of the air conditioner exceeds a predetermined value a plurality of times.

9. The performance diagnosis device for the air conditioner according to claim 1, wherein the air conditioner is an electric type or a heat driven type.

10. The performance diagnosis device for the air conditioner according to claim 1, further comprising:

an output unit configured to output the corrected individual characteristic curved surface data as a three-dimensional graph of the operation conditions to a display.

11. A performance diagnosis method for an air conditioner, the method comprising the steps of:

collecting and recording operation data on the air conditioner;

using an equipment characteristic database that is a data group covering operation conditions meeting specifications of the air conditioner;

receiving evaluation parameters from an input unit and normal data of operation of the air conditioner during an initial period of operation of the air conditioner;

calculating individual characteristic curved surface data of a performance of the air conditioner, in a state in which the operation of the air conditioner is not deteriorated in an entire presumed operation range, based on the operation data on the air conditioner and the operation conditions; and comparing part of the operation data of the air conditioner with the individual characteristic curved surface data to evaluate performance of the air conditioner, wherein the individual characteristic curved surface data is corrected with respect to the equipment characteristic database so as to correspond to the operation data of the air conditioner.

12. The performance diagnosis method for the air conditioner according to claim 11, further comprising:

outputting the corrected individual characteristic curved surface data as a three-dimensional graph of the operation conditions to a display.

* * * * *